(12) United States Patent
Campbell et al.

(10) Patent No.: US 9,107,421 B2
(45) Date of Patent: Aug. 18, 2015

(54) BAKING PAN SYSTEM

(76) Inventors: Sharon Lynn Campbell, Rochelle, VA (US); George Campbell, Sr., Rochelle, VA (US)

( * ) Notice: Subject to any disclaimer, the term of this patent is extended or adjusted under 35 U.S.C. 154(b) by 0 days.

(21) Appl. No.: 13/487,870

(22) Filed: Jun. 4, 2012

(65) Prior Publication Data

US 2012/0308701 A1    Dec. 6, 2012

Related U.S. Application Data

(60) Provisional application No. 61/492,955, filed on Jun. 3, 2011.

(51) Int. Cl.
*A21B 3/13*    (2006.01)

(52) U.S. Cl.
CPC ............... *A21B 3/135* (2013.01); *A21B 3/137* (2013.01); *A21B 3/133* (2013.01)

(58) Field of Classification Search
CPC ......... A47J 37/01; A21D 13/08; A21B 3/131; A21B 3/133; A21B 3/135; A21B 3/137; A21B 5/02
USPC ............. 249/60, 63, 69–72, 74, 76, 119–120, 249/123–126, 128, 129, 132, 134–135, 156, 249/164, 177, 203, DIG. 1; 220/501, 502, 220/528, 529, 541, 549, 550, 552, 555, 220/373.4, 625; 426/512; 99/426, 428, 430; D7/610, 703, 354, 553.1
See application file for complete search history.

(56) References Cited

U.S. PATENT DOCUMENTS

| | | | | | |
|---|---|---|---|---|---|
| 130,843 | A | * | 8/1872 | Butler | 249/175 |
| 557,685 | A | * | 4/1896 | Mains | 99/430 |
| 572,509 | A | * | 12/1896 | Wilson | 249/144 |
| 1,290,186 | A | * | 1/1919 | Held | 220/531 |
| 2,553,880 | A | * | 5/1951 | Stigler | 220/555 |
| 2,607,338 | A | * | 8/1952 | Parenti | 126/385.1 |
| 2,960,218 | A | * | 11/1960 | Cheeley | 206/223 |
| 2,978,285 | A | * | 4/1961 | Jester | 312/284 |
| 3,141,400 | A | * | 7/1964 | Powers | 249/82 |
| 3,182,397 | A | * | 5/1965 | Entenmann | 30/301 |
| 3,473,489 | A | * | 10/1969 | Sargent | 426/275 |
| 3,610,135 | A | * | 10/1971 | Sheridan | 99/430 |
| 4,416,906 | A | * | 11/1983 | Watkins | 426/107 |
| 4,452,419 | A | * | 6/1984 | Saleeba | 249/53 R |
| 5,446,965 | A | * | 9/1995 | Makridis | 30/303 |
| 5,537,917 | A | * | 7/1996 | Schiffer et al. | 99/442 |
| 5,676,050 | A | * | 10/1997 | Beck | 99/428 |

(Continued)

FOREIGN PATENT DOCUMENTS

| | | | | |
|---|---|---|---|---|
| DE | 4004786 A1 | * | 7/1990 | .............. A21B 3/13 |
| KR | 102010227929 | * | 11/2010 | ............. B22C 19/00 |

OTHER PUBLICATIONS

Foreign copy of KR 102010227929.*

*Primary Examiner* — Yogendra Gupta
*Assistant Examiner* — Emmanuel S Luk
(74) *Attorney, Agent, or Firm* — Sheldon H. Parker, Esq

(57) ABSTRACT

The baking pan disclosed herein creates a single, or double, bite sized baked product that has a crispy outer edge and a chewy interior. The ratio between the side of the interior insert of the pan and the exterior side of the pan is critical to form the desired product. The pan can range in size from about a 5 inch exterior diameter to a 16 inch exterior diameter with the interior insert increasing accordingly.

19 Claims, 4 Drawing Sheets

(56) References Cited

U.S. PATENT DOCUMENTS

| | | | |
|---|---|---|---|
| 5,678,475 A * | 10/1997 | Villar Otero | 99/432 |
| 6,561,784 B1 * | 5/2003 | Atwell | 425/133.1 |
| 7,163,185 B2 * | 1/2007 | Dail | 249/120 |
| D553,913 S * | 10/2007 | Jackson | D7/587 |
| 7,480,999 B2 * | 1/2009 | Atwater et al. | 30/289 |
| 7,975,643 B1 * | 7/2011 | Johnson | 118/14 |
| 8,046,921 B2 * | 11/2011 | Mastroianni | 30/114 |
| 8,092,849 B2 * | 1/2012 | Kane | 426/280 |
| 2004/0020055 A1 * | 2/2004 | Zuker | 30/114 |
| 2005/0092189 A1 * | 5/2005 | Hall | 99/426 |
| 2005/0217498 A1 * | 10/2005 | Miller et al. | 99/426 |
| 2008/0111050 A1 * | 5/2008 | Hamblin et al. | 249/61 |
| 2009/0249965 A1 * | 10/2009 | Hauser | 99/552 |

* cited by examiner

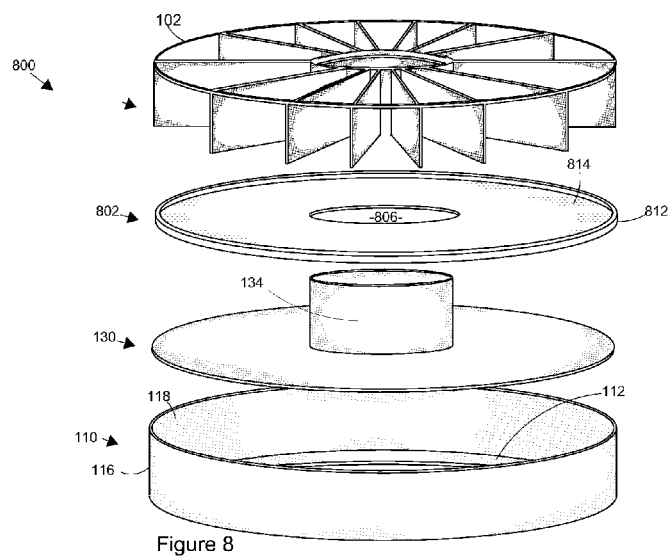
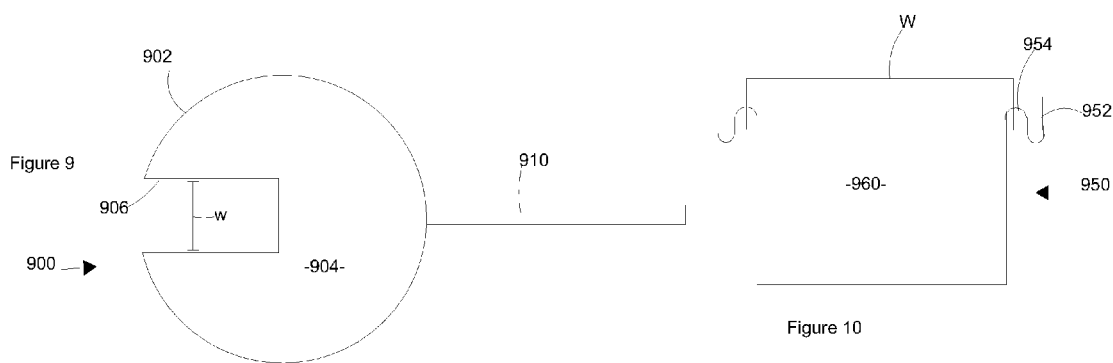

BAKING PAN SYSTEM

CROSS REFERENCE TO PRIOR APPLICATIONS

This application is a conversion of provisional application U.S. Ser. No. 61/492,955 filed Jun. 3, 2011 which is incorporated herein as through recited in full.

FIELD OF THE INVENTION

The invention relates to a baking pan dimensioned to produce a crisp baked product.

BACKGROUND OF THE INVENTION

When brownies, cakes, and other goods are baked, the edges adjacent to the sides of the baking pan have a different consistency than the center area. The proximity to the pan edges provides a chewier, firmer edge than those portions that are not near the sides of the baking pan. Some people prefer these firmer portions of the baked good, especially corner portions having two (2) edges that were baked touching the pan sides). This is especially true when the baked goods are brownies.

In order to have a greater portion of the baked goods with firm sections, the pan disclosed in U.S. Pat. No. 6,412,402 to Griffin uses crests 10 to provide additional baking surface. These crests are randomly placed within the pan and are in the shape of a pyramid. This does not provide a sharp, evenly firm edge. Further, although surface contact is increased, the crests do not provide any additional airflow.

Kaiser pans has a spring form pan that also has a bund insert in addition to the flat base. The traditional spring form pans do provide the easy release mechanism, however they do not provide any additional surfaces for cooking. The bund pan insert does provide the additional airflow, however again, it does not provide the firmer product due to the bund scallops and smooth corner.

The pan provided by the pending invention creates bake goods with a firm edge and reduces cooking time through the creation of additional airflow. The ratio between the inner rim and the outer sides, as disclosed below, is critical to achieve the firmer product.

SUMMARY OF THE INVENTION

A baking pan system that produces different densities within the food being cooked. The pan has a base pan that has at least one side, having an interior periphery and a hollow interior. A support rim extends from interior into the hollow interior at about a 90 degree angle. An insert member having an insert base with an open central region and an outer periphery is dimensioned to fit within the hollow interior of the base pan. The insert member has a center rim extending at about 90 degrees from the insert base adjacent to the open central region. The ratio between the at least one side and the central rim is about 2.7 to 1 to 1.6 to 1. The height of the at least one side and the rim is about 1 inch to about 3 inches. A handle extends across the rim. The base pan can also be a spring form pan.

For a base pan with a diameter of about 5.5 inches the rim on the insert would have a diameter of about 2 inches. A base pan with a diameter of about 7.5 inches has a rim on the insert with a diameter of about 4.25 inches. A base pan with a diameter of about 12 inches has an insert rim with a diameter of about 8 inches. A base pan with a diameter of about 16 inches and would have an insert rim diameter of about 10 inches.

Removable dividers, can be used to divide the food goods prior to cooking. In one embodiment a divider has an interior brace with an interior periphery having a radial, having a height greater than the height of the rim, extend from the inner brace and are spaced radially around the inner brace. An outer brace having a peripheral dimension that is slightly less that the interior peripheral dimension of said sides of said base pan can be use to further support the subdividers. A handle, having two ends attached to the inner brace, can extend across the inner brace. The insert fits within the base pan and the divider fits within the insert for storage.

In another embodiment at least one removable divider is used, each of the at least one removable dividers having a body member and a hook member. The body member is dimensioned to fit between the rim and the at least one side of the base pan. The hook member is dimensioned to hook onto the top edge of the rim and the top edge of the at least one side of the base pan.

A serving pedestal, having a base and a receiving platter, can be used. The receiving platter has an outer periphery less than the inner periphery of said support rim, allowing the base pan to drop down and the insert to rest on the receiving platter.

A service pan, having a base with an outer periphery and an inner periphery and dimensioned to sit on the insert member can be used. Preferably the service pan has a lip, extending 90 degrees from the base, around the outer periphery.

A serving spatula having an outer diameter about equal to the insert, a cut out section dimensioned to receive the rim and a handle can be used for serving.

BRIEF DESCRIPTION OF THE DRAWINGS

FIG. 8 is an exploded perspective view of an alternate embodiment of the pan incorporating a service pan, in accordance with the invention;

FIG. 9 is a top view of a spatula for use in serving, in accordance with the invention; and FIG. 10 is a front view of an individual divider, in accordance with the invention.

DETAILED DESCRIPTION OF THE INVENTION

Definitions

Figure 2:
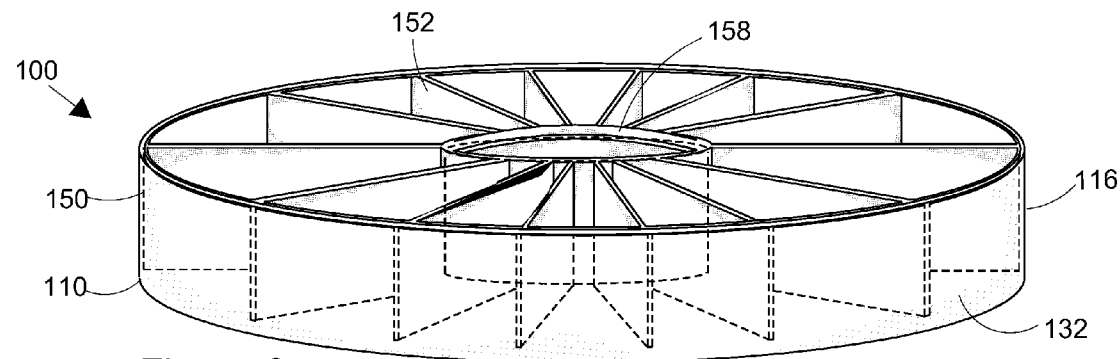
FIG. 2 is a line drawing, perspective of all elements assembled, in accordance with the invention.

As used herein "baked product" shall refer to any product that is cooked through the baking process, either in conventional, microwave, convection, or other type ovens. The baked product does not necessarily have to be edible and the ovens can be heated by any means.

Description

The disclosed pan is designed and proportioned to cook bit sized bakery items such as brownies and/or cookies as well as some cakes and quick breads. Additional examples of baked and unbaked products that could use the pan would be cakes, coffee cakes, tarts, and Quiche. The design of the disclosed pan creates a bite sized product that can be chewier in the center and crispier along all edges than produced by regular square or rectangular pans. The proportions between the outer and inner rings are critical to provide the option to produce the desired product, as too great a distance between the inner and outer ring and either the edges will be overdone or the middle not sufficiently done. Conversely, too small a distance could eliminate the chewy center by cooking the product to the "crispy" level throughout.

In the disclosed pan, the diameter of the inner rim increases as the diameter of the outer ring increases in order to maintain the desired texture as the ratios between the two are important. For example, in the small size pan the diameter of the rim is 2 inches while the diameter of the side is 5.5 inches, yielding a pan volume of 30.90 sq. in. In the large the rim is 10 inches in diameter while the base side is 16 inches yielding a pan volume of 306.15 sq. inches. Another way to look at the examples is that the batter surface of the base pan is between 55% and 37%, +1-10% or a ratio of 1:1.6 to 1:2.7+/−5%.

This is in contrast to the standard angel food tube cake pans where 89% to 77% of the pan is available for the batter.

Other differences between the disclosed pan and the standard angel food pan are the angle between the flat base and the sides. In the disclosed pan the angle is at 90%, +/−5% while in angel food, and bundt pans, the angle is greater than 90%. The 90% angle is also applicable to the rim, which is also 90% from the base of the pan. In angel food and bundt pans, the interior tub is shaped like a cone. All the soft angles of the prior art pans produce a product with rounded, soft edges while the sharp 90% angle of the disclosed pan produces crisper edges. Further the height of the disclosed pan is 1-4 inches, preferable 2-3 inches.

A determination of the firmness can be made by the level to which the pan is filled, for example a brownie having a cookie crispness would have less filling than a brownie having a cake consistency with firm edges. Likewise, the food being cooked will affect the consistence. A Quiche crust will have a flakier, crispier crust.

Also critical is the gauge of the pan. If the gauge is too high the pan can torque or warp at the heat required to bake the product or during the removal of the baked goods. The flexible pans, although able to withstand the heat required for baking, would not permit easy release of the baked goods due to the flexibility nor is this material usable on two piece pans. The flexibility works when the mass of the baked product is sufficient to hold a structure and is unbroken. For example, muffins work in flexible pans due to their being a single, round mass. The disclosed donut shaped baked products would not work in a flexible pan due to the ratio between the inner and outer rings. Further, other designs suggested herein would not be viable due to the lack of mass, for example the pointed end of a heart, or the stem of a clover.

The high gauge materials also create issues with respect to baking in that the edges of the baked goods would not have the heat distribution and protection provided by lower gauge pans. This permits the outer edges to be over cooked, or burned, in order to have the center properly cooked. This would be especially evident in the donut shaped pan where the balance between done center and over done edges is more critical due to the pan design.

Conversely, lower gauge pans can eliminate the crisp edge and over bake the entire product. The use of the additional, unnecessary, material to create the pan also increases cost of manufacture, weight and cooking time.

As this is a multi piece pan, the weight issues must be taken into consideration unlike single piece pans. For example; glass, ceramic and cast iron would all be too heavy and, in the case of glass and ceramic, breakable.

Additionally, the ability to create an angle between the sides and bottom of the pan of about 90 degrees is preferable to achieve the desired product. Although the angle can vary slightly, the 90 degree angle gives a crispy edge, unlike curved pans which produce a more evenly cooked product.

Figure 1:
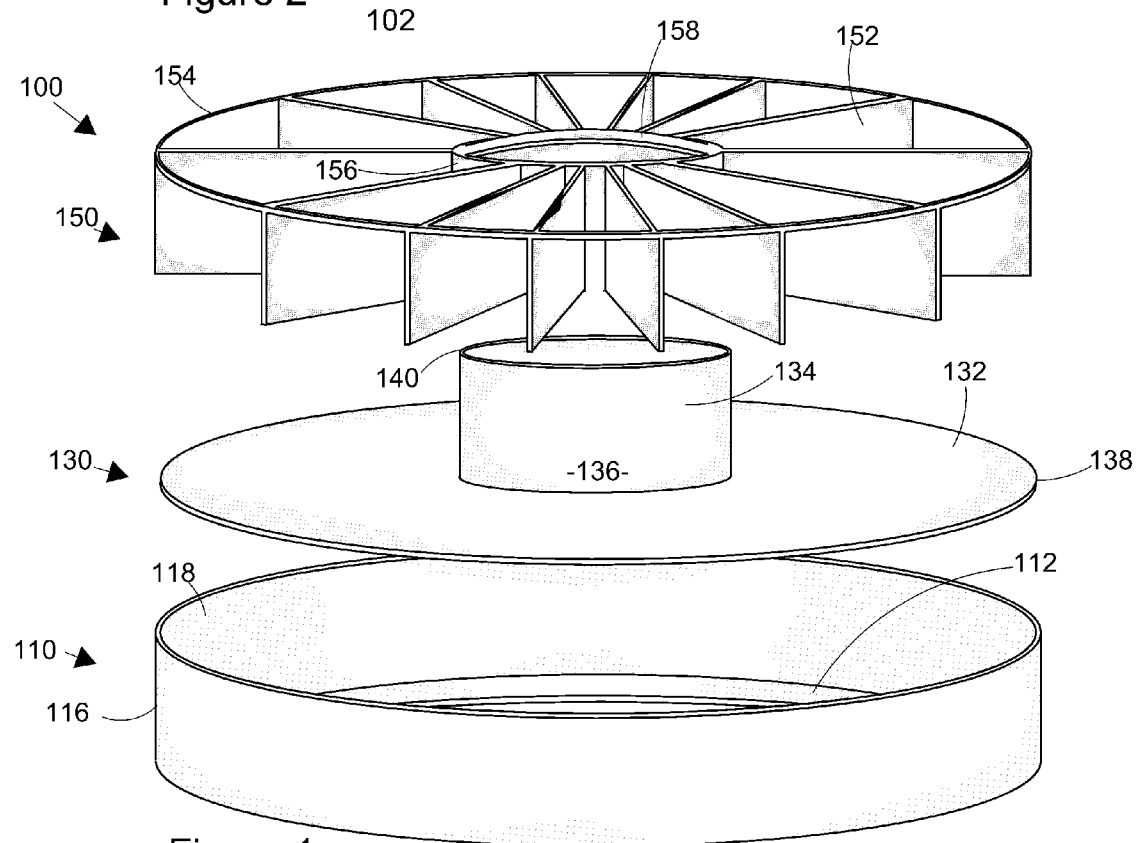
FIG. 1 is an exploded line drawing, perspective view of the elements of the pan, in accordance with the invention.

In FIG. 1 the baking pan 100 is illustrated, with all elements, exploded to clearly show the elements. The hollow base pan 110 is provided with a support rim 112 that is placed at right angles to the side 116 and receives the insert base 132. The support rim 112 extends into the base pan 110 a distance sufficient to prevent the insert base 132 from falling through the base pan 110 side 116. The insert 130 has an insert base 132 and rim 134 surrounding a center opening 136. The outside periphery 138 of the insert base 132 is slightly less than the interior diameter 118 of the side 116. The angle between the insert base 132 and the rim 134 is also at about a 90 degree angle, although in some applications a slight taper can be used.

The disclosed pan has three cooking surfaces sufficiently dimensioned to provide a browning or crisping surface. These three surfaces, in combination with the heat exposure that is received on the unprotected top of the product, cook the baked product faster on all four surfaces than in the middle. This is unlike standard square or rectangular pans or even pans used for angel food cake, some decorative cakes or bunt pans. The small centers of these prior art pans are generally used to facilitate even cooking due to the depth of the cake. In the disclosed pan, the rim 134, being open, cooks the inner edges of the product to about the same level as the outer edge. This is due to the dimensioning of the rim 134 that provides increased heat circulation. Additionally, the open rim 134 serves to decrease cooking time.

Once cooked, the baked product can be cut into individual pieces for consumption using the divider 150 that, in the embodiment illustrated in FIG. 2, has 14 pieces created by the subdividers 152. This is an example only and any number of subdividers 152 can be used. Preferably, at least three dividers are used and most preferably, at least six dividers can be used. The upper limit is dependent predominantly on the number of individual pieces of baked product is desired. It is within the ability of one of ordinary skill in the art to select an upper limit for the number of dividers that should be used. It should be noted that the baked product can be cooked with the divider 150 in place, with removal of the divider 150 from the baked product creating the individual pieces. In order to enable this option, it is preferred that the divider 150 be dimensioned to fit within the base pan 100 and insert indicated generally as 130. This also enables easy, compact storage of the pan 100. To accomplish this, the outer brace 154 has a periphery slightly less than the interior diameter 118 of the base 110 and with the inner brace 156 having an inner periphery slightly greater than the outer periphery 140 of the rim 134. The subdividers 152 span the outer brace 154 and inner brace 156 and maintain the structure of the divider 150. The subdividers 152 are positioned at substantially right angles to the insert base 132. A handle 158 can extend from one side of the inner brace 156 to the other to enable the divider 150 to be easily used.

The subdividers 152 are preferably manufactured from a non-stick material as a convenience for ease of removal, although any baking material used for the pan can be used. If a non-stick material is not used, the subdividers 152 will, like the pan 100, require coating with a non-stick spray, butter, etc. The subdividers 152 are used to pre-cut the product when placed prior to cooking, or cut the product after cooking. Neither the baking time nor consistency is affected by the presence, or lack of presence, of the divider 150. In order for the handle 158 to clear the rim 134, the divider 150 must either be slightly higher than the rim 134 or the handle 158 must have a sufficiently sharp increase in height to go above the rim 134. Although as illustrated herein the subdividers 152 are only supported by the inner brace 156 and outer brace 154, an additional interior support can be added if desired. The interior support could be full, from top to bottom the divider 150, or partial, such as additional rings. Any additional supports would, however, have to have a diameter greater than the rim 134. Depending on the material of manufacture a single interior or exterior brace could be used with the subdividers extending from the single brace. Additionally, the inner and outer braces could have clips or other members that would enable the subdividers to be removed.

To achieve the level of crispness to which the pans are directed, the distance between the side 116 and the insert rim 134 is between about 1.5 inches and about 4 inches. The ratio between the insert rim 134 and the diameter of the sides 116, as noted above, is important to ensure that there is sufficient mass to enable the product to remain in one piece. For example a 4 inch outer diameter of the base pan 110 and a 1.5 inch rim 134 would provide a product that would have sufficient mass to prevent it from falling apart and the volume to be cooked would have a crispness to it. However, a 1.5 inch rim 134 with a 8 inch base pan 110 diameter, would require a greater thickness to maintain structural integrity.

As each of the pieces of baked product is designed to be bite sized, the depth of the pan would preferably be in the range of about 1.5 to 1.75 inches, although deeper pans could be used in some circumstances that will be evident to those skilled in the baking arts. The pans would be filled with batter between 0.5 and one (1) inch, again depending upon the baked product.

The size of the bites can change, although increasing the bite size to more than about 3 inches reduces the desired results of the crisp edges and chewy interiors. To maintain the desired consistence and product integrity, the insert rim 134 would be increased as the outer diameter of the base 110 is increased.

In FIG. 2 the insert 130 has been placed within the base pan 110 and the divider 150 has been placed within the insert 130, forming a compact unit. As can be seen in this figure, the subdividers 152 are at substantially right angles to the base 132 with the edges of the subdividers 152 being adjacent to the sides 116. It can also be seen in this figure the dimensioning between the handle 158 and the rim 134.

Figure 3:
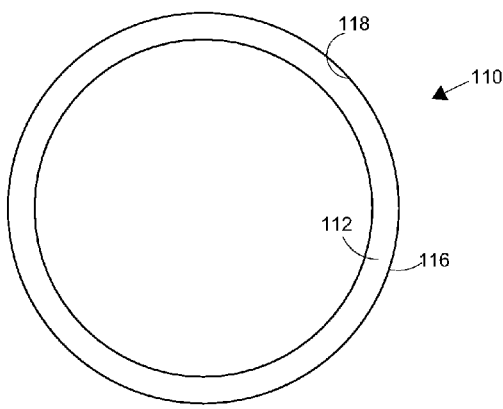
FIG. 3 is a top view of the base pan, in accordance with the invention.
Figure 4:
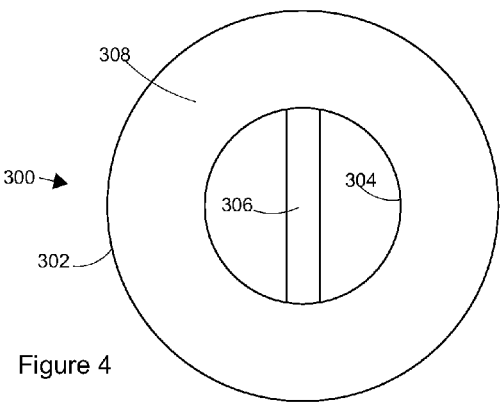
FIG. 4 is a top view of an alternate embodiment of an insert having a handle, in accordance with the invention.

A top view of the base pan 110 is illustrated in FIG. 3 showing the side 116 and support rim 112 to receive the insert bases 300 and 130. The insert 300 of FIG. 4 is dimensioned as noted above with insert 130, however in this embodiment a handle 306 is added. Whether or not a handle 306 is used, the outer periphery 302 must fit within the interior 118 of the base pan 110 while the interior diameter 304 must clear the rim 134.

Figure 5:
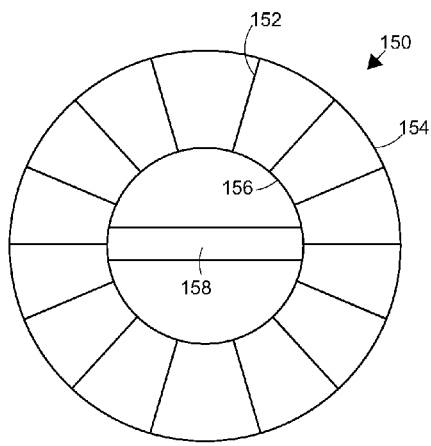
FIG. 5 is a top view of the divider, in accordance with the invention.

The top view of the divider 150, FIG. 5, illustrates the placement of the subdividers 152 in this example embodiment. As stated heretofore this number of subdividers 152, thereby the determination of the number of individual pieces, can be varied and will be dependent upon the desired end result. As stated heretofore, the outer brace 154 and inner brace 156 are dimensioned to fit within the rim 134 and side 116, placing the subdividers 152 on the base 132 and 308 (FIG. 4).

Figure 6:
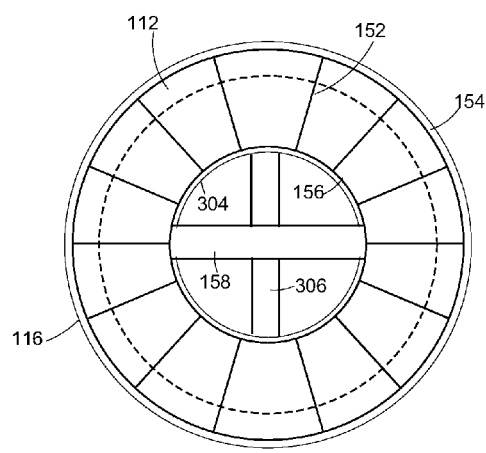
FIG. 6 is a top view of the assembled elements of FIGS. 3, 4, and 5, in accordance with the invention.

The baking pan 100 is illustrated in FIG. 6 with the insert 300 placed within the base pan 110 and the divider 150 placed into the insert 300. As can be seen, the handle 306 of the insert 300 fits under the handle 158 of the divider 150. As can be seen, the inner brace 156 has a slightly larger diameter than the rim 304 with the insert 300 resting on the support rim 112. The outer brace 154 can be seen fitting within the side 116.

Figure 7:
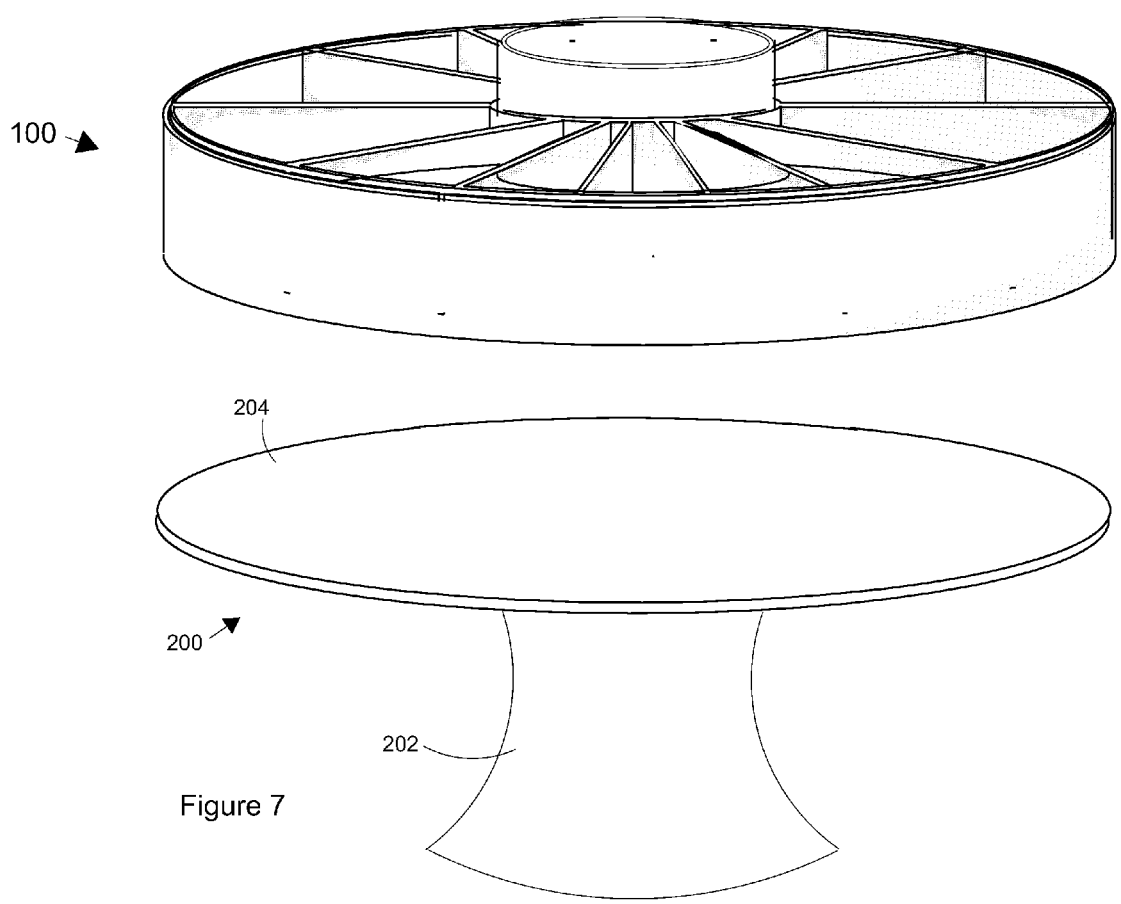
FIG. 7 is an exploded perspective view of the pan and removal stand in accordance with the invention.

In FIG. 7, a serving pedestal 200 is illustrated with the baking pan 100 positioned above. The pedestal 200 consists of a base 202 and a receiving platter 204 that is dimensioned to fit within the interior of the base pan 110. The baking pan 100 can be removed from the oven and immediately placed on the pedestal 200. Due to the dimensioning of the receiving platter 204, the base pan 110 will drop down, leaving only the insert 130 and the divider 150. The baked product can then be served or the divider 150 removed prior to serving.

The platter 204 can be any material appropriate to serving platters, such as Pyrex, stainless steel, composites, etc. It is preferable that the base 202 is manufactured from a material that non-heat conductive to enable the pedestal 200 to be easily carried.

In FIG. 8, an optional serving pan 802 is illustrated. Although the service pan 802 can be included in all sizes, it is not necessary for the smaller sizes. The service pan 802 is placed on top of the insert 130 prior to adding the food to be cooked. By using the serving pan 802, the food can be removed using the insert 130 and then the serving pan 802 slipped off the insert 130, providing a flat surface on which to cut. While the smaller sized goods can be easily removed from the pan, the larger pans create serving problems.

To prevent the food from seeping between the serving pan 802 and the insert 130, the peripheral edge 812 of the serving pan base 814 should be equal to that of the insert 130. The interior hole 806 should be slightly larger than the outer diameter of the rim 134.

Although optional, it is preferable that the serving pan 802 has a lip 804 to facilitate lifting the serving pan 802 from the insert 130. When the serving pan 802 has a lip 804

To facilitate lifting the food from the small ring a spatula 900 can be use. The spatula 900 has a cutout 906 opposite the handle 910. The width "w" of the cutout 906 should be slightly larger than the rim 134 of the smaller pan. The outer diameter 902 of the body 904 is preferably approximately the said diameter as the insert 130, thereby ensuring that all of the food product is supported during removal while not making the spatula 900 larger than necessary.

The handle 910 can be straight or at an angle, depending upon manufacturing preferences. The material of manufacture is preferably a plastic or similar material that will not scratch the non-stick surface of the pans.

An alternative to the dividers disclosed heretofore is the individual divider 950 as illustrated in FIG. 10. The individual divider 950 is manufactured as a single piece with arcs 954 cut to form tabs 952. The width W between the arcs 954 must be the same as the distance between the top of the rim and the top of the side of the base. This dimensioning enables the arcs 954 to rest on the top edge of the rim and base. The body 960 of the divider 950 is dimensioned to fit between the sides of the base and side of the rim, thereby separating the food product into the desired number of pieces.

EXAMPLES

Example I

Smallest pan: 5.5 inches exterior diameter
Side of pan height: 2.50 inches
Insert rim: 2.5 inches diameter
Batter fills the pan: 0.50 inches
Bite size: 2.5 inches
Volume=10.30 cubic inches of product

Example II

Mid sized pan: 7¾ inches exterior diameter
Side of pan height 2.50 inches
Insert rim: 4.25 inches diameter
Batter fills the pan: 0.50 inches
Bite size: 2.5 inches
Volume: 16.52 cubic inches of product

Example III

Large pan: 12 inches exterior diameter
Side of pan height: 2.5 inches
Insert rim: 6 inches diameter
Batter fills the pan: 0.75 inches
Bite size: 1.75 inches
Volume: 47.10 cubic inches of product

Example IV

Largest pan: 16 inches exterior diameter
Side of pan height: 2.5 inches
Insert rim: 10 inches diameter
Batter fills the pan: 1 inch
Bite size: 3 inches
Volume=122.46 cubic inches of product The examples provided herein are for a circular pan however other shapes can be used. The criticality lies in the proportions between the base pan side 116 and the rim 134 of the insert 130.

The pans as illustrated herein are designed to have the insert lifted out from the insert base, however that does not preclude actually flipping the pan unit over to remove the food.

As the disclosed pan can be used for cooking a number of different products, from pizzas to breads to brownies, the consumer could benefit from different sized rims on the inserts. It should be noted that when the pan is being dimensioned for products other than baked goods, the ratios between the interior and exterior rims are not as critical. Therefore, only the inserts can be sold with different rim diameters to accommodate different foods.

What is claimed is:

1. A pan system for baking food to produce different densities within said food, said pan comprising:
   a base pan, said base pan having:
      at least one side and a hollow interior, said at least one side having an inner periphery,
      a support rim and, said support rim extending from said inner periphery of said at least one side into said hollow interior at about a 90 degree angle;
   an insert member, said insert member having:
      an insert base with a central opening and an outer periphery, said outer periphery being dimensioned to fit within said inner periphery of said base pan and rest on said support rim,
      a rim contiguous with said insert member, said rim surrounding said central opening and extending at about 90 degrees from said insert base and being approximately parallel to said at least one side, said central opening increasing heat circulation through said central opening to cook inner edges of said food,
   a ratio between said at least one side and said rim is from about 1:1.6 to 1:2.7+/−5%
   wherein said at least one side, said insert base and said rim have with said food, thereby distributing the heat unevenly within the food and cooking an inner edge of said food about equal to an outer edge of said food.

2. The pan system of claim 1 further comprising a removable divider, said divider having:
   an interior brace having an interior periphery, said interior periphery having a radial dimension greater than said rim, and
   subdividers extending from said inner brace and being spaced radially.

3. The pan system of claim 2 wherein said removable divider further comprises an outer brace, said outer brace having a peripheral dimension that is less that the interior peripheral dimension of said at least on side of said base pan.

4. The pan system of claim 2 wherein said divider further comprises a handle extending across said interior brace and having two ends, each of said two ends being attached to the edge of said interior brace.

5. The pan system of claim 3 wherein said subdividers have a height greater than the height of said rim.

6. The pan system of claim 3 wherein said insert base and said divider fit within said base pan for storage.

7. The pan system of claim 1 wherein said at least one side and said rim have a height of about 1 inch to about 2 inches.

8. The pan system of claim 1 wherein said insert further comprises a handle, said handle extending across said rim.

9. The pan system of claim 1 further comprising a serving pedestal, said serving pedestal having a base and a receiving platter dimensioned to receive said insert base, said receiving platter having an outer periphery less than the inner periphery of said support rim to enable said base pan to drop down for removal.

10. The pan system of claim 1 further comprising a service pan, said service pan having a base dimensioned to be received on said insert base with an outer periphery equal to said outer periphery of said insert base and an inner periphery greater than said rim.

11. The pan system of claim 10 wherein said service pan has a lip around said outer periphery, said lip extending about 90 degrees from said base.

12. The pan system of claim 1 further comprising a serving spatula, said serving spatula having a handle, and a body, said body having an outer diameter equal to said outer periphery of said insert base, a cut out section dimensioned to receive said rim to enable a user to slid said body under said food for removal, said outer diameter of said body supporting said food and said cut out section receiving said rim.

13. The pan of claim 1 wherein said base pan has a diameter of about 5.5 inches and said rim on said insert has a diameter of about 2 inches.

14. The pan of claim 1 wherein said base pan has a diameter of about 7.5 inches and said rim on said insert has a diameter of about 4.25 inches.

15. The pan of claim 1 wherein said base pan has a diameter of about 12 inches and said rim on said insert has a diameter of about 8 inches.

16. The pan of claim 1 wherein said base pan has a diameter of about 16 inches and said rim on said insert has a diameter of about 10 inches.

17. The pan of claim 1 wherein said base pan is a spring form pan.

18. The pan system of claim 1 further comprising at least one removable divider, each of said at least one removable divider having a body member and a hook member, said body member dimensioned to fit between said rim and said at least one side of said base pan and said hook member being dimensioned to hook onto a top edge of said rim and a top edge of said at least one side of said base pan.

19. A pan system for baking food to produce different densities within said food, said pan system comprising:
    a base pan, said base pan having:
        at least one side and a hollow interior, said at least one side having an inner periphery and a height of about 1 to 3 inches,
        a support rim, said support rim extending from said inner periphery of said at least one side about 1 to 3 inches into said hollow interior at about a 90 degree angle;
    an insert member, said insert member having:
        an insert base with a central opening and an outer periphery, said outer periphery being dimensioned to fit within said base pan and rest on said support rim,
        a rim contiguous with said insert member, said rim surrounding said central opening and extending at about 90 degrees from said insert base and being approximately parallel to said at least one side, said central opening increasing heat circulation through said central opening to heat said rim to provide a cooking surface,
    at least one divider member, said at least one divider member dimensioned to fit between said at least one side of said base pan and said rim of said insert member;
    a handle, said handle extending from one point on said rim to an opposing point on said rim;
        a ratio between said at least one side and said rim being about 1:1.6 to 1:2.7+/−5%
    wherein said at least one side, said insert base and said rim provide three surfaces of contact with said food, thereby distributing heat unevenly within the food and cooking an inner edge of said food about equal to an outer edge of said food.

\* \* \* \* \*